United States Patent [19]

Maeda

[11] Patent Number: 5,678,022
[45] Date of Patent: Oct. 14, 1997

[54] STORAGE CONTROL SYSTEM WITH AUXILIARY STORAGE AND OPTIMIZED PROCESS DATA LENGTH AND GAP TO REDUCE TRACK AND CYLINDER SWITCHING

[75] Inventor: Yasuhiro Maeda, Hokkaido, Japan

[73] Assignee: NEC Corporation, Tokyo, Japan

[21] Appl. No.: 124,192

[22] Filed: Sep. 21, 1993

[30] Foreign Application Priority Data

Sep. 22, 1992 [JP] Japan .................................. 4-252417

[51] Int. Cl.$^6$ .............................. G06F 13/00; G11B 5/09
[52] U.S. Cl. ..................... 395/438; 395/404; 395/439; 395/497.02; 395/836; 395/885; 360/48; 360/50; 369/93
[58] Field of Search .................. 395/427, 438, 395/439, 497.01, 497.02, 404, 835, 836, 853, 885, 886, 892, 894; 360/48, 50; 369/93

[56] References Cited

U.S. PATENT DOCUMENTS

| 4,001,883 | 1/1977 | Strout et al. ............... 360/48 |
| 4,366,512 | 12/1982 | Janak et al. ............... 360/48 |
| 4,430,712 | 2/1984 | Coulson et al. ............ 395/456 |
| 4,882,642 | 11/1989 | Tayler ..................... 395/497.02 |
| 5,239,424 | 8/1993 | Hasegawa et al. .......... 360/48 |
| 5,388,090 | 2/1995 | Hoshino et al. ........... 369/275.3 |

FOREIGN PATENT DOCUMENTS 0540114   5/1993   European Pat. Off. .

*Primary Examiner*—Glenn Gossage
*Attorney, Agent, or Firm*—Foley & Lardner

[57] ABSTRACT

A storage control system with auxiliary storages includes a system information generator which determines an optimum process data length and gap value to minimize switching between cylinders or tracks in reading/writing of data based on device information obtained from a specified auxiliary storage. Based on the determined optimum process data length and gap value, a data area generator secures a data area on the specified auxiliary storage. The system information generator determines the process data length and the gap value so that the process data length is less than the size of a track in the specified auxiliary storage and satisfies either of the following conditions: (a) Size of a track can be divided by the process data length; or (b) Sum of the process data length and the gap value is a value obtainable by multiplying the track size by an integer.

6 Claims, 11 Drawing Sheets

FIG. 6

| DEVICE ADDRESS | OPTIMUM PROCESS DATA LENGTH | OPTIMUM GAP VALUE |
|---|---|---|
| 0 | 5120 BYTES | 1 (5120 BYTES) |
| 1 | 2048 BYTES | 4 (8192 BYTES) |
| 2 | 2560 BYTES | 3 (7680 BYTES) |

140 — 141 — 142 — 14

DATA BLOCKS ON BUFFER MEMORY          (1 BLOCK : 1024 BYTES)

FIG.10
(PRIOR ART)

| PROCESS DATA LENGTH | GAP VALUE |
|---|---|
| 4096 BYTES | 1 (4096 BYTES) |

STORAGE CONTROL SYSTEM WITH AUXILIARY STORAGE AND OPTIMIZED PROCESS DATA LENGTH AND GAP TO REDUCE TRACK AND CYLINDER SWITCHING

BACKGROUND OF THE INVENTION

1. Field of the Invention

The present invention relates to a storage control system with auxiliary storages. More particularly, it relates to a storage control system with auxiliary storages which generates a data area on the auxiliary storages used by a data processing application and processes data for that data area.

2. Description of the Related Art

In a conventional storage control system with auxiliary storage which is a fixed magnetic disk, a data area is generated and secured on the auxiliary storage by issuance of a generation request specifying the device address of the auxiliary storage A data area generator obtains the process data length and the gap value stored in the system information area and generates and secures a data area on the auxiliary storage according to such process data length and gap value.

The process data length is the size of data treated as a processing unit (unit read or written at a time) in processing data (reading or writing) for the auxiliary storage. Data are processed according to such a processing unit. The gap value is the size of the gap existing between the data having the process length, and is set as a value obtainable by multiplying the process data length by an integer. This gap is provided for synchronization between data processing by software and data processing at the auxiliary storage.

The above system information area has a fixed process data length and a gap value that is judged to be optimum for the system. FIG. 10 shows the contents of the system information area with the process data length of 4096 bytes and the gap value of 1 (process data length×1=4096 bytes).

Based on the process data length and the gap value having such contents, the data area for an auxiliary storage is generated with 10 sectors 0 to 9, each of which has 512 bytes in a track. As shown in FIG. 11, when data is written to the data area, one data block may be extended over two tracks. In the example of FIG. 11, one data block has eight sectors and the second data block is extended over tracks 1 and 2. Naturally, one data block may be extended not only over two tracks but also over two cylinders.

When one data block is thus extended over two tracks or cylinders, data accessing is accompanied by switching between tracks or cylinders, which results in a slow data processing speed.

SUMMARY OF THE INVENTION

It is an object of the present invention to provide a storage control system with auxiliary storages for which switching between tracks or cylinders does not occur during processing of data written a process data length, thus minimizing the disk waiting time and speeding up data processing.

According to a preferred embodiment of the present invention to attain the above object, a storage control system with auxiliary storages comprises a plurality of auxiliary storages, and a device information obtaining means to obtain the device information from the auxiliary storage. There is also provided a system information generation means to determine the process data length and the gap value to minimize switching between cylinders or tracks in reading/writing of data for the auxiliary storage based on the device information obtained by the device information obtaining means. Further provided is a system information storage means to store the-process data length and the gap value determined by the system information generation means and a data area generation means to secure a data area on the auxiliary storage according to the process data length and the gap value stored in the system information storage means.

According to a further preferred embodiment of the present invention of a storage control system, the system information generation means determines a process data length which is less than the size of one track for the auxiliary storage and which can divide evenly into the size of one track. Further, the system information generation means determines the process data length and the gap value to satisfy the condition where the process data length is less than the size of a track in the auxiliary storage and the sum of the process data length and the gap value is a value obtainable by multiplying the track size by an integer.

According to a further preferred embodiment of a storage control system the system information generation means determines the process data length and the gap value so that the process data length is less than the size of a track in the auxiliary storage and either of the following conditions is satisfied:

(a) the size of a track can be divided by the process data length.

(b) the sum of the process data length and the gap value is a value obtainable by multiplying the track size by an integer.

According to another preferred embodiment of the present invention, a storage control system further comprises a data processing means to read or write data from or to the auxiliary storage according to the process data length and the gap value stored in the system information storage means.

According to a still another preferred embodiment of a storage control system the device information includes the number of tracks per cylinder, the number of sectors per track and the number of bytes per sector for the auxiliary storage.

Other objects, characteristics and effects of the present invention will be clarified in the detailed description below.

BRIEF DESCRIPTION OF THE DRAWINGS

FIG. 6 is a diagram to show an example of contents for the system information storage means;

FIG. 10 is a diagram to show an example of contents of the system information area;

DESCRIPTION OF THE PREFERRED EMBODIMENT

Figure 1:
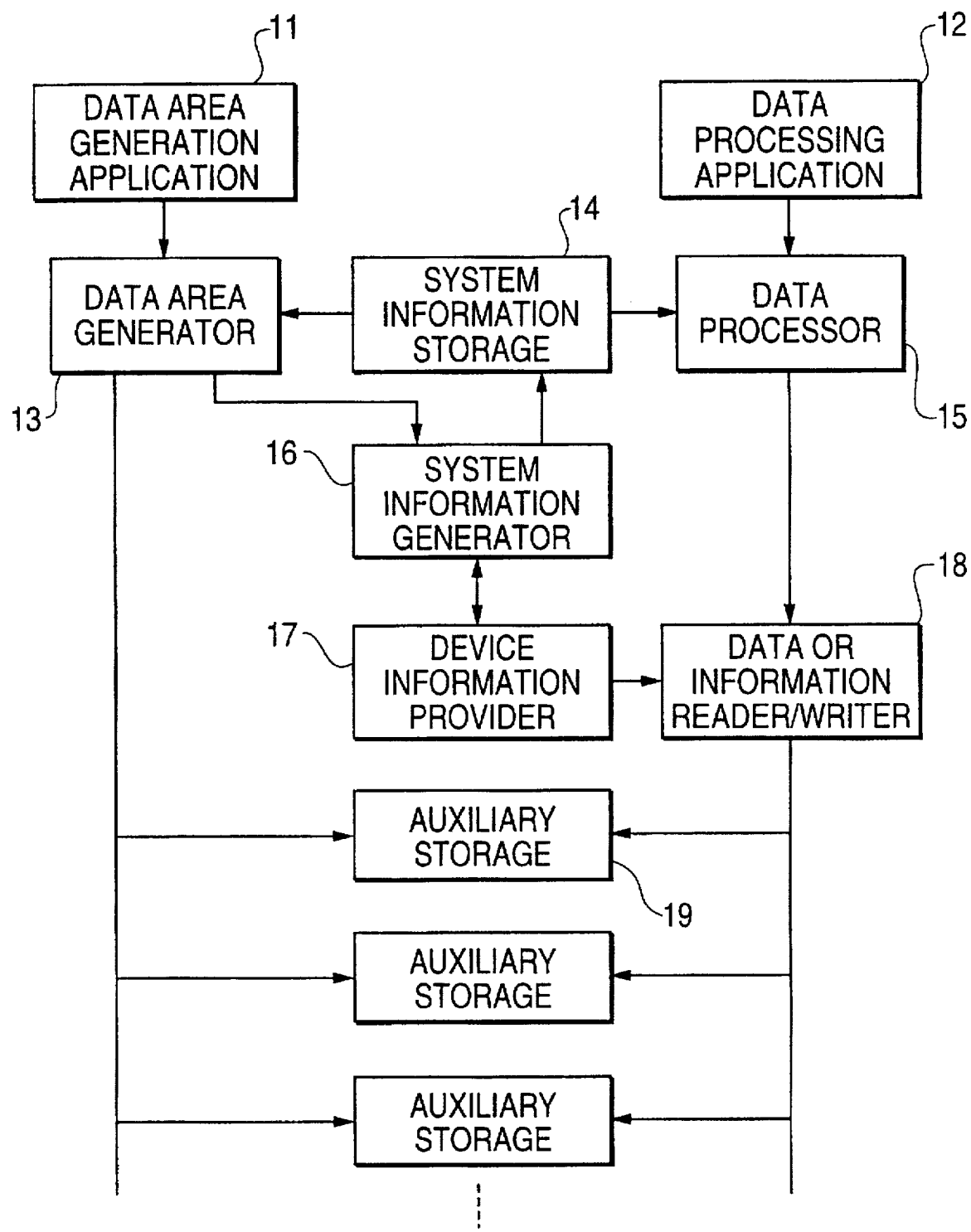
FIG. 1 is a block diagram to show the configuration of a storage control system with auxiliary storages according to a preferred embodiment of the present invention.

Referring to the attached figures, preferred embodiments of the present invention will be described in detail below. FIG. 1 is a block diagram showing an embodiment of a storage control system according to the present invention. In the figure, a storage control system comprises a data area generation application 11, a data processing application 12, a data area generator means 13, system information storage 14, a data processor 15, a system information generator 16, a device information provider 17, a data or information reader/writer means 18 and auxiliary storages 19. Such a storage control system is, for example, used in an operating system.

The data area generation application 11 is an application which requests generation and securing of a data area on an auxiliary storage 19 before execution of data processing. The data processing application 12 is an application which request reading and writing of the data for the auxiliary storage 19.

The data area generator 13, upon request from the data area generation application 11, generates and secures a data area on the applicable auxiliary storage 19 according to the contents of the system information storage 14. Upon request from the data processing application 12, the data processor 15 intitiates processing through the data or information reader/writer 18 of the data area of the auxiliary storage 19.

The system information storage 14 stores the optimum process data length and the optimum gap value calculated by the system information generator 16 for each of the device addresses of the auxiliary storages 19. Gap value may be expressed as an integer that when multiplied by the optimum process data length is a number of bytes.

The system information generator 16 determines the optimum process data length and the optimum gap value to satisfy the conditions described later based on the device information.

The device information provider 17 obtains the device information and, through the data or information reader/writer 18, provides the device information for the auxiliary storage 19. The device information comprises the number of tracks per cylinder, the number of sectors per track and the number of bytes per sector in each auxiliary storage 19.

In response to execution of instructions from the data processor 15 and the device information provider 17, the data or information reader/writer 18 issues a read or write request command to the auxiliary storage 19.

The storage control system has a plurality of auxiliary storages 19, each of which comprises a magnetic disk device. Each auxiliary storage 19 has a device address. When requesting data area generation or data processing for an auxiliary storage 19, the above data area generation application 11 and the data processing application 12 specify the auxiliary storage 19 using its device address.

The auxiliary storage 19 is usually treated as a plurality of cylinders and a plurality of tracks belonging to each cylinder. Each track is divided into a plurality of sectors having a fixed size and the sector serves as a data storage unit.

Access to an auxiliary storage 19 is made according to the address specifying the cylinder, track and sector numbers.

Referring now to FIGS. 2 to 5, generation and securing of a data area and data processing contents according to the present embodiment are described.

Figure 2:
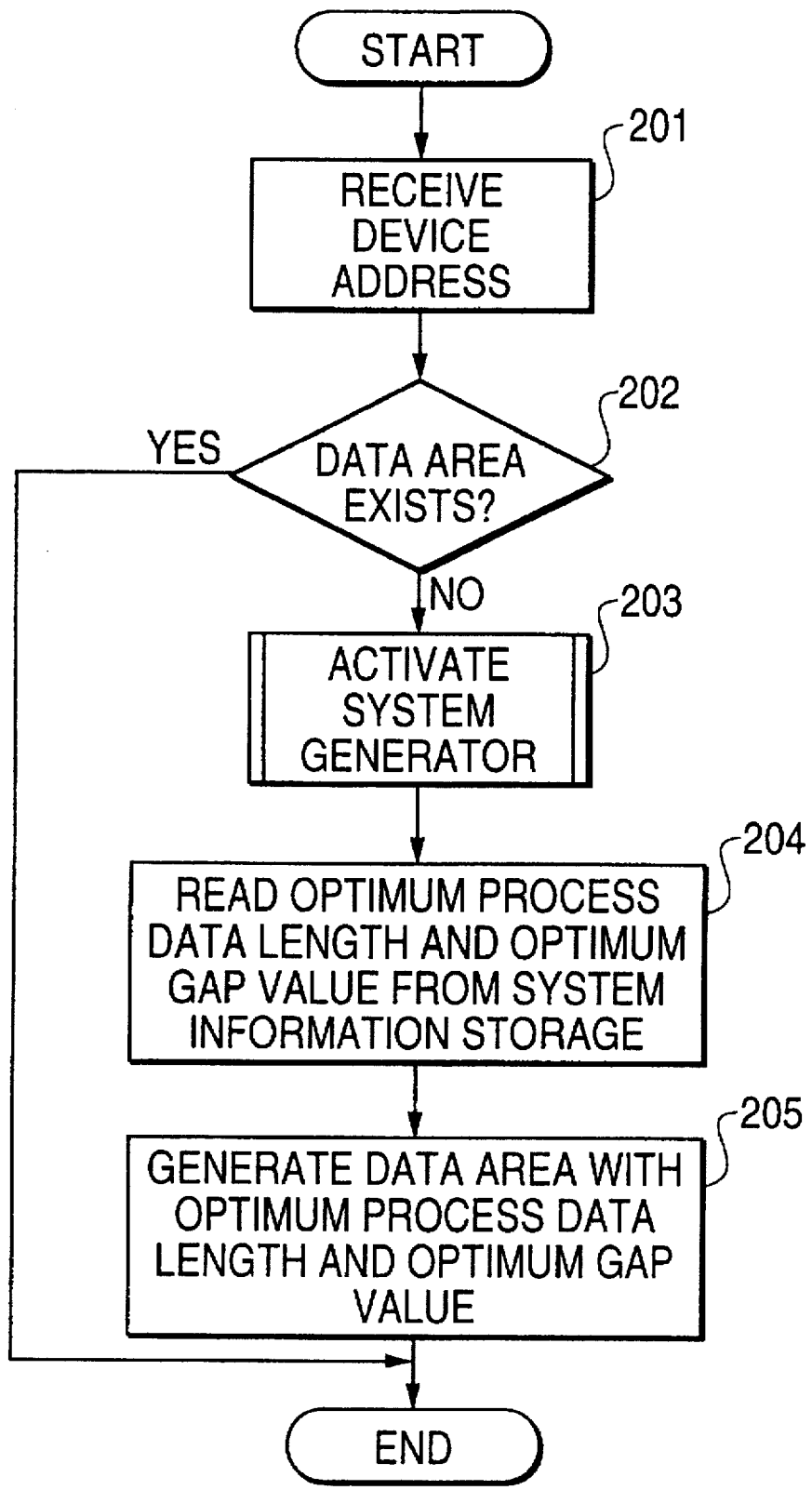
FIG. 2 is a flowchart to illustrate the processing by the data area generation means in the embodiment of FIG. 1.

FIG. 2 is a flowchart to illustrate the processing by the data area generator 13.

The data area generation application 11 is activated and issues, to the data area generator 13, an execution request having the device address of the subject auxiliary storage 19 as input information.

The data area generator 13 receives the device address (Step 201) and judges whether a data area has been generated in the auxiliary storage 19 specified by the device address (Step 202). When the data area has already been generated, the processing is terminated as a normal completion. If no data area has been determined to be generated in Step 202, then the system information generator 16 is activated (Step 203).

Figure 3:
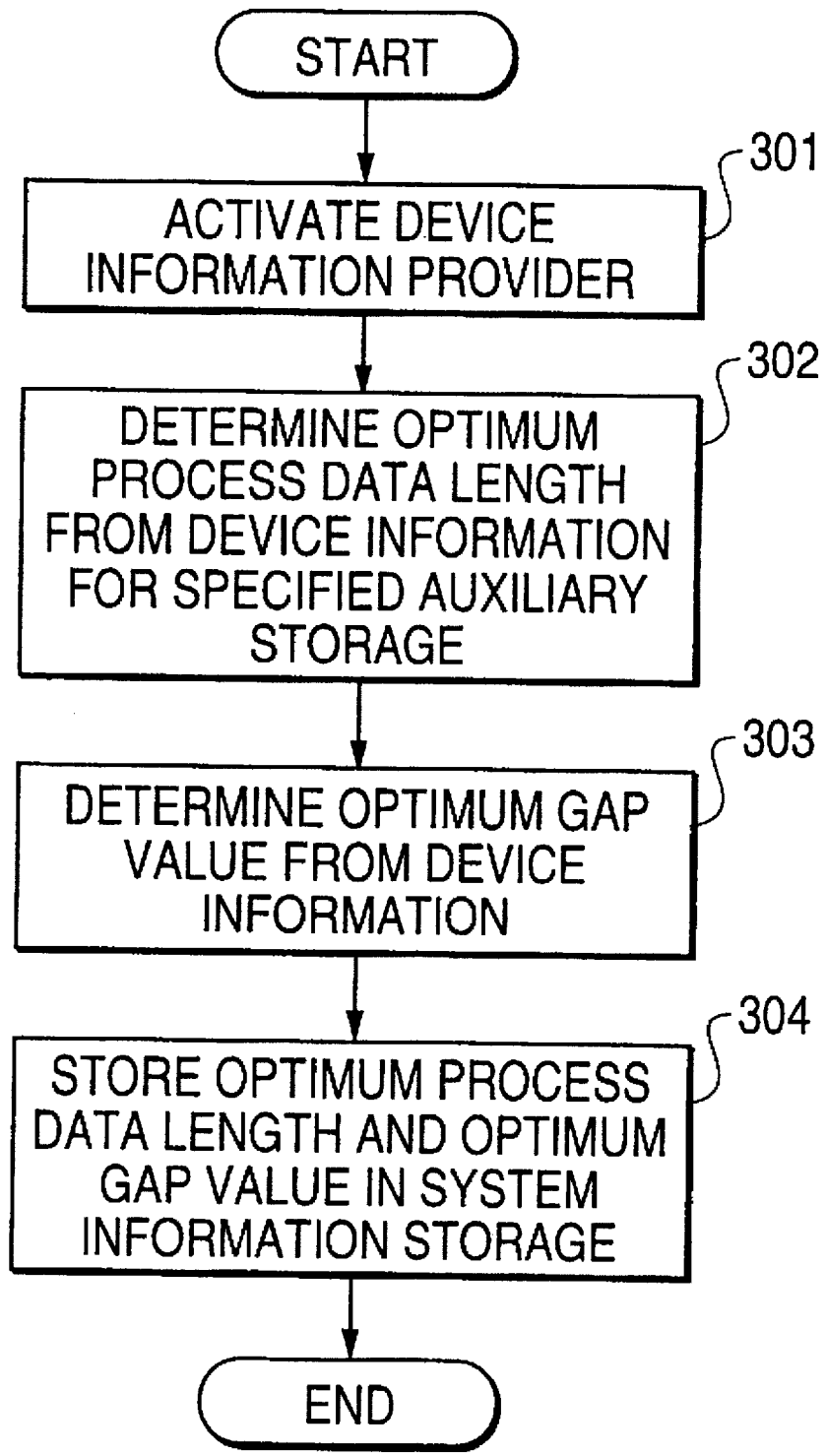
FIG. 3 is a flowchart to illustrate the processing by the system information generation means in the embodiment of FIG. 1.

Referring now to the flowchart of FIG. 3, the system information generator 16 it first activates the device information provider 17 by specifying a device address in order to obtain the device information for the specified auxiliary storage 19 (Step 301).

The system information generator 16 determines the optimum process data length and the gap value for the specified auxiliary storage 19 based on the device information obtained (Steps 302 and 303).

The optimum process data length and the gap value are calculated according to the conditions described below to minimize the waiting time caused by switching between tracks or cylinders in data accessing.

The process data length and the gap value are to be determined so that the number of sectors (blocks) of the process data length becomes less than the number of sectors in one track (the number of sectors of process data length < the number of sectors of one track) and either of the following conditions is satisfied:

(a) The number of sectors in one track can be divided by the number of sectors of the process data length. The gap value can be determined arbitrarily.

(b) the sum of the sectors of the process data length and the gap value is a value obtained by multiplying the number of sectors per track by an integer.

The system information generator 16 stores the determined optimum process data length and the gap value in the system information storage 14 together with the device address (Step 304).

The data area generator 13, upon completion of storage of the optimum process data length and the gap value in the system information storage 14 by the system information generator 16, reads the optimum process data length and the gap value from the system information storage 14 (step 204 in FIG. 2) and generates a data area on the auxiliary storage 19 specified by the device address according to the optimum data length and the gap value (Step 205 in FIG. 2).

Figure 4:
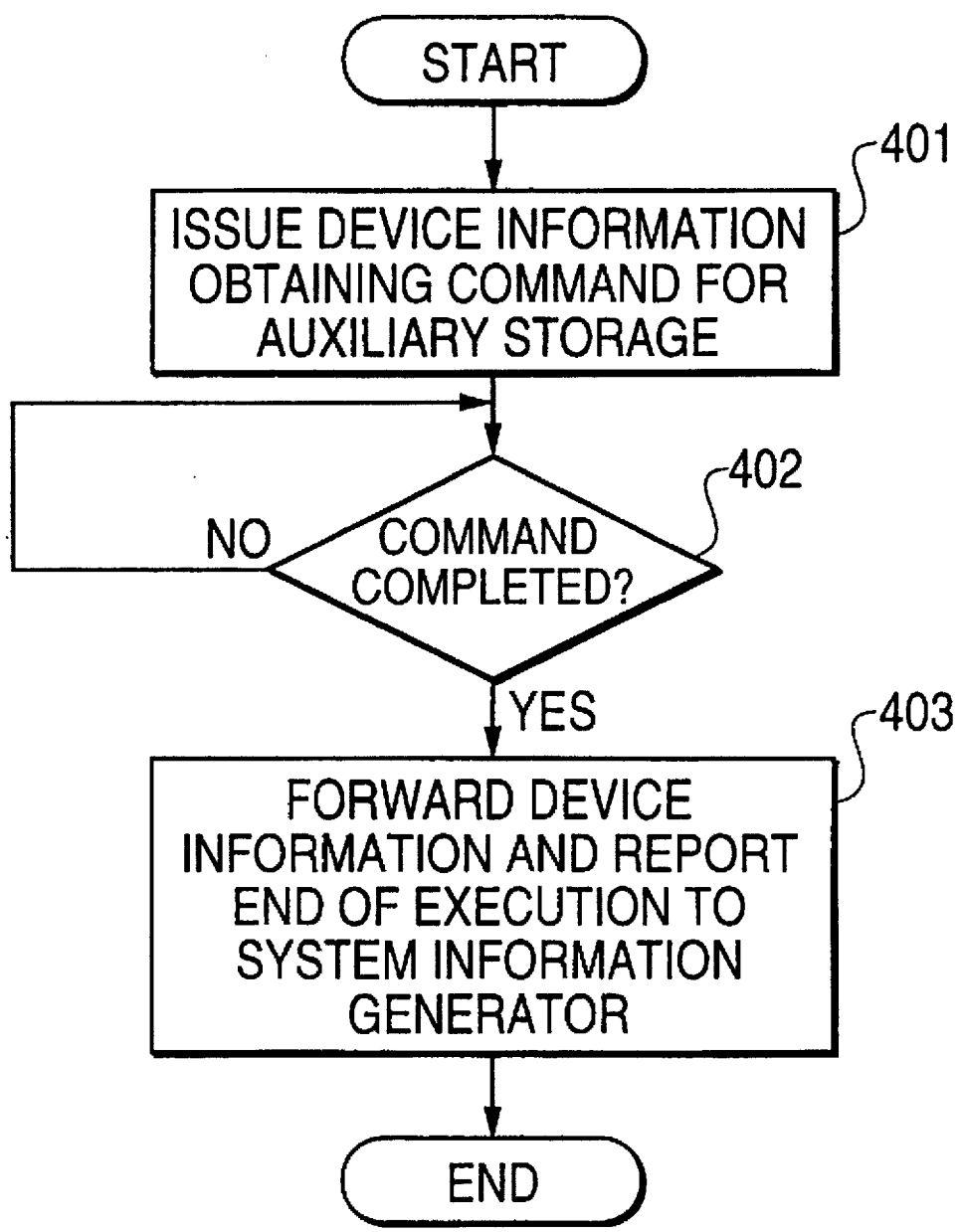
FIG. 4 is a flowchart to illustrate the processing by a data or information read/write means in the embodiment of FIG. 1.

FIG. 4 is a flowchart illustrating the processing by the device information provider 17, which is activated by the system information generator 16. When activated, the device information provider 17 calls or activates the data or information reader/writer 18, and the data or information reader/writer 18 issues a device information obtaining command to obtain the device information for the auxiliary storage 19 specified by the device address (Step 401). Then, the device information provider 17 waits for the device information obtaining command to be completed (Step 402). Upon completion, the device information provider 17 forwards the obtained device information to the system information generator 16 as the request source (Step 403).

Now that the data area is thus generated with the above processing, data can be processed (read and written) for the specified auxiliary storage 19.

For data processing at an auxiliary storage 19, the data processing application 12 is activated. The data processing application 12 issues, to the data processor 15, an execution request having the subject device address, request process data length (different from the optimum process data length determined as above), data transfer address and execution command (data read or write command) as the input information.

Figure 5:
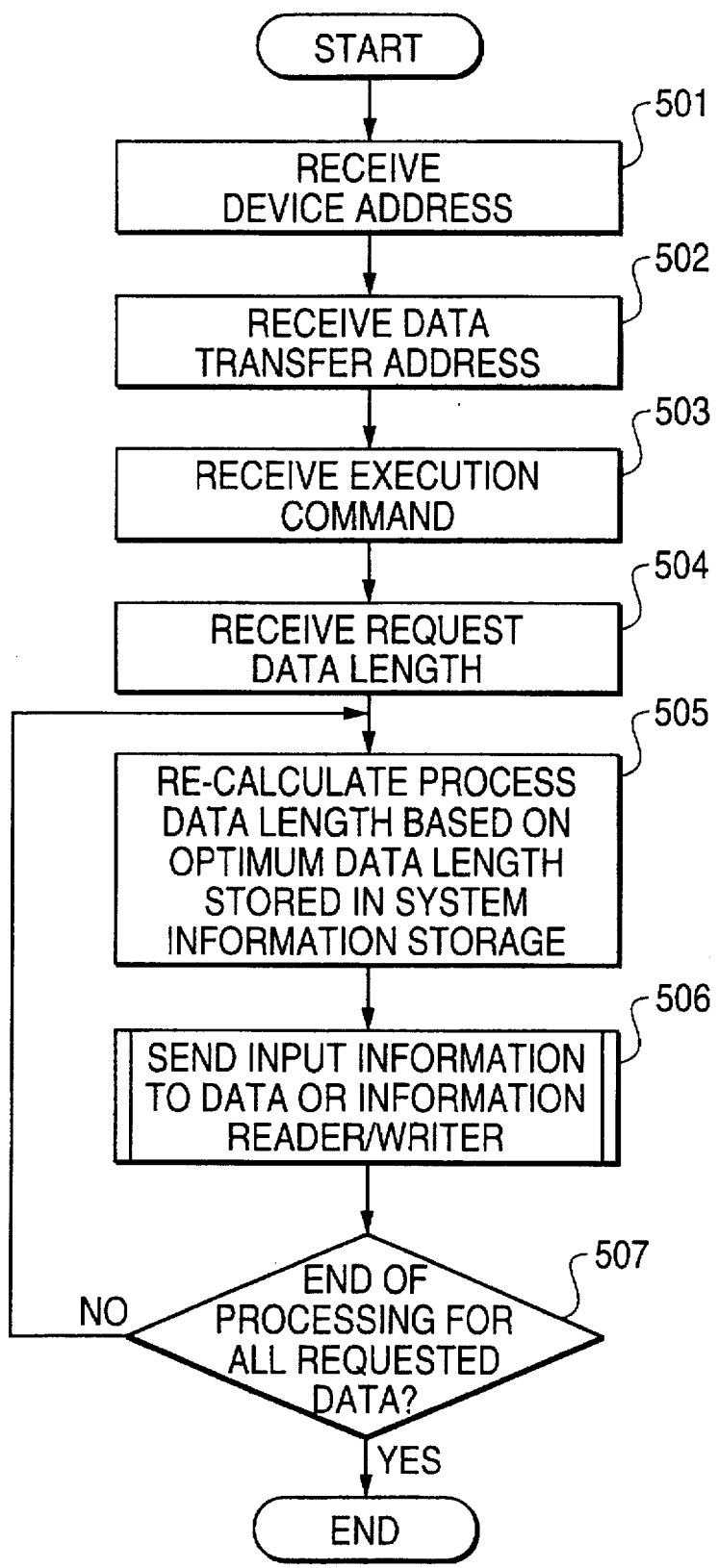
FIG. 5 is a flowchart to illustrate the processing by the data processing means in the embodiment of FIG. 1.

Referring now to the flowchart of FIG. 5, the processing by the data processor 15 is described. The data processor 15 receives the input information from the data processing application 12 (Steps 501 to 504). Then, it calculates the request process data length again according to the optimum process data length stored in the system information storage means 14 (Step 505).

The input information including the request process data length is sent to the data or information reader/writer means 18 (Step 506). In reading the data, data sent from a user memory (not shown) is divided according to the process data length and the gap value and stored in a buffer memory in the data or information reader/writer 18.

The data or information reader/writer 18 issues, to the applicable auxiliary storage 19, a read or write command with the input information and waits for the end of the command processing. Upon completion of the command, a notice of completion is sent to the data processor 15, which is the request source.

The data processor 15 further judges whether processing is completed for all request data (Step 507). If not, the procedure from Step 505 is repeated.

FIG. 6 shows the contents of the system information storage 14. As shown in the figure, the system information storage 14 comprises a device address column 140, an optimum process data length column 141 and an optimum gap value column 142. In the figure, an example is given of the optimum process data length and the optimum gap value for the auxiliary storage 19 where one track sector has 512 bytes and each track has 10 sectors numbered 0 to 9.

For the auxiliary storage 19 with the device address "0", the optimum process data length is set at 5120 bytes (10 sectors) and the gap value at 1 (10 sectors=5120 bytes) to satisfy condition (a) above.

For the auxiliary storage 19 with the device address "1", the optimum process data length is set at 2048 bytes (4 sectors) and the gap value at 4 (16 sectors=8192 bytes) to satisfy condition (b) above. In this case, the optimum process data has a length of four sectors and the number of sectors in a track (10 sectors) cannot be divided by the number of sectors of the process data length. The sum of the number of sectors of the process data length and the gap value (20 sectors) is a value obtainable by multiplying the number of sectors per track by an integer (2).

For the auxiliary storage 19 with the device address "2", the optimum process data length is set at 2560 bytes (5 sectors) and the gap value at 3 (15 sectors=7680 bytes) to satisfy condition (a) above.

Figure 7:
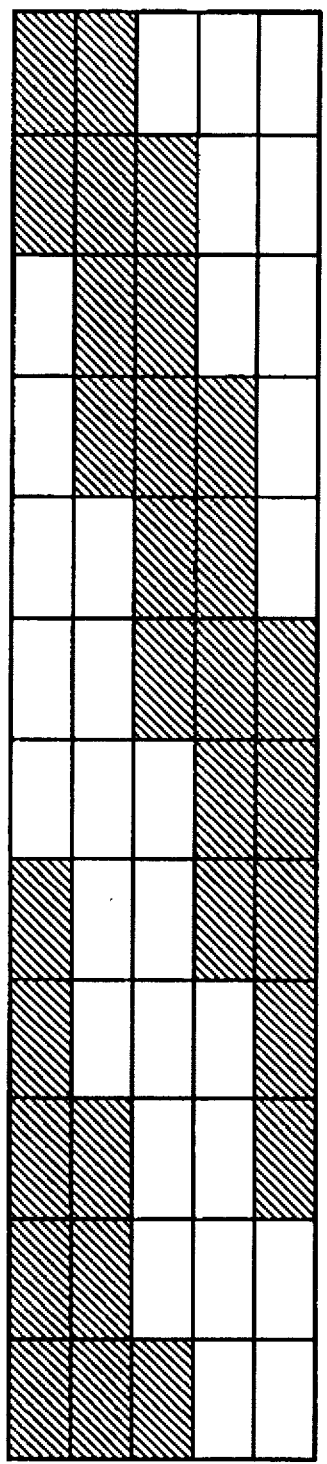
FIG. 7 is a diagram to show the data disposition on the buffer memory according to this embodiment.

FIG. 7 shows the data disposition on the buffer memory in the data or information reader/writer 18 for the data written to or read from the auxiliary storage 19. Here, the buffer memory comprises a plurality of blocks of 1024 bytes. For the auxiliary storage 19 with the device address "0", the optimum process data length is determined to be 5120 bytes and the gap value to be 1 (=5120 bytes) and they are stored in the system information storage means 14. Therefore, the data is divided by the optimum process data length (five blocks) and laid out consecutively on the buffer memory with intervals of the maximum gap value.

Figure 8:
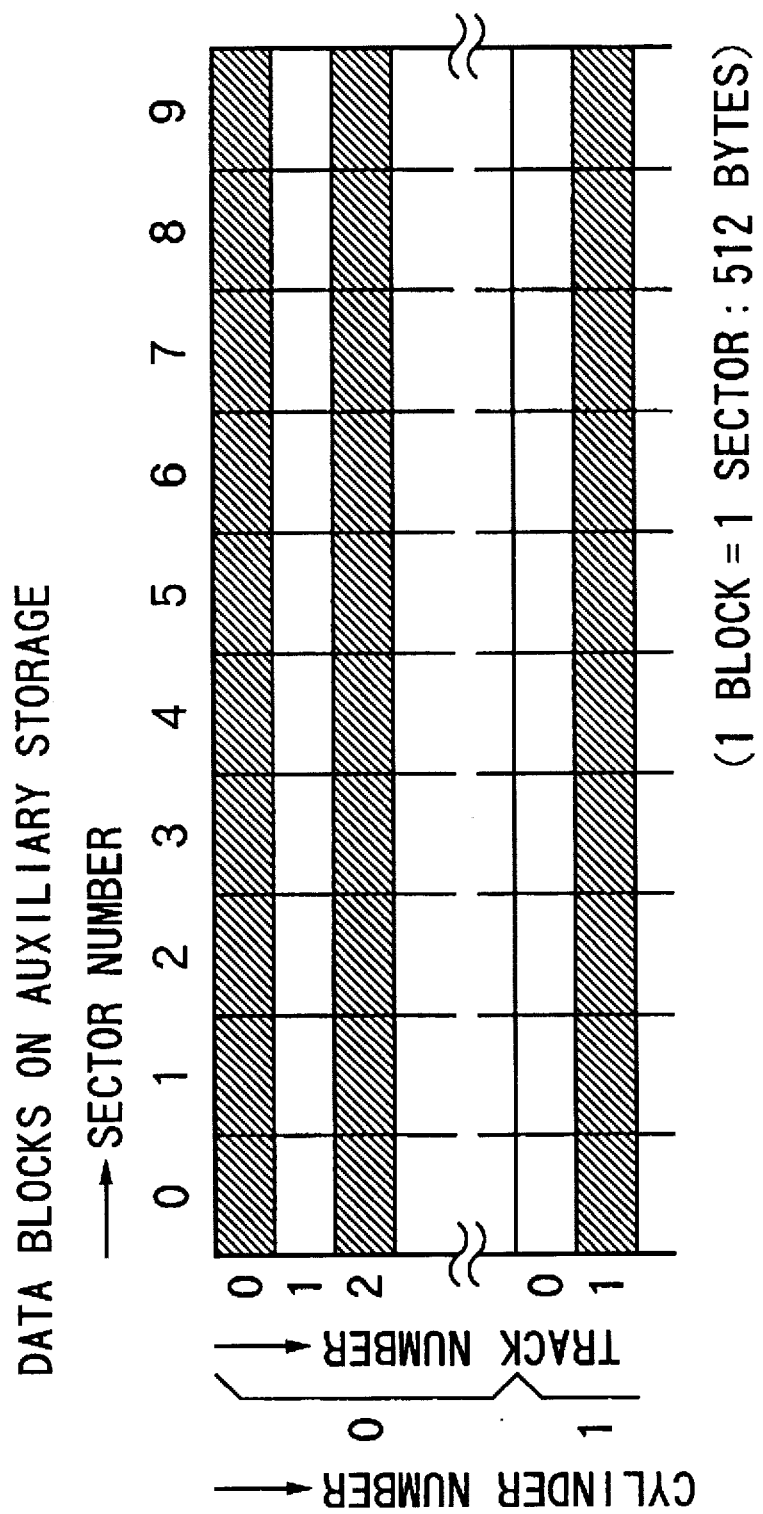
FIG. 8 is a diagram to show the data disposition on a first auxiliary storage according to this embodiment.

FIG. 8 shows the data disposition when the data is written to the auxiliary storage 19 with the device address "0" in FIG. 6 according to the optimum process data length of 5120 bytes and the optimum gap value of 1 (5120 bytes). As shown in the figure, the data are allocated for each optimum process data length without covering a plurality of tracks. Since data are processed for the auxiliary storage 19 by treating the optimum process data length as a processing unit, switching between tracks or cylinders does not occur so long as the data is written or read by process data length. This minimizes the waiting time of the disk and enables high-speed data processing.

Figure 9:
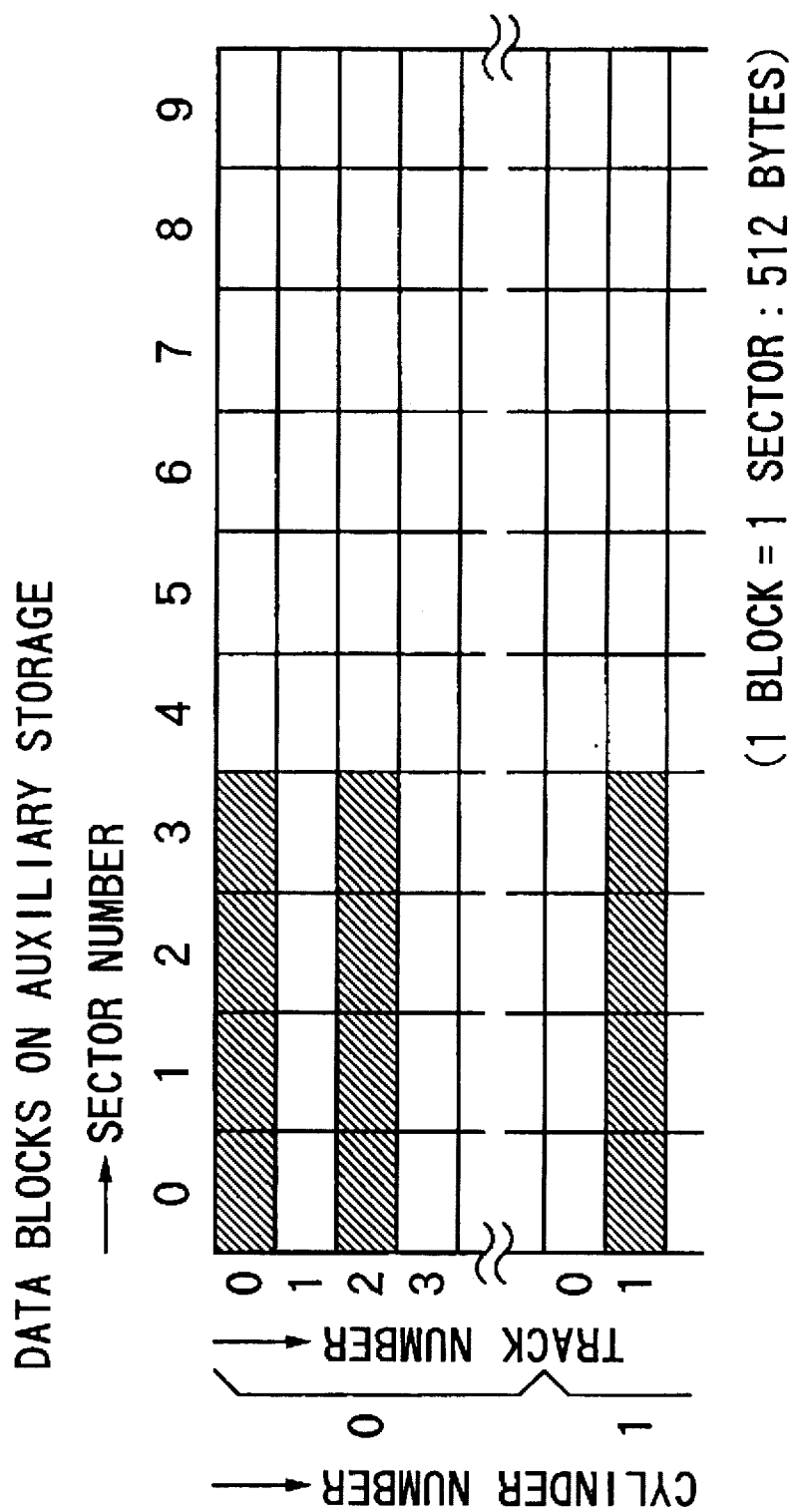
FIG. 9 is a diagram to show the data disposition on another auxiliary storage according to this embodiment.
Figure 11:
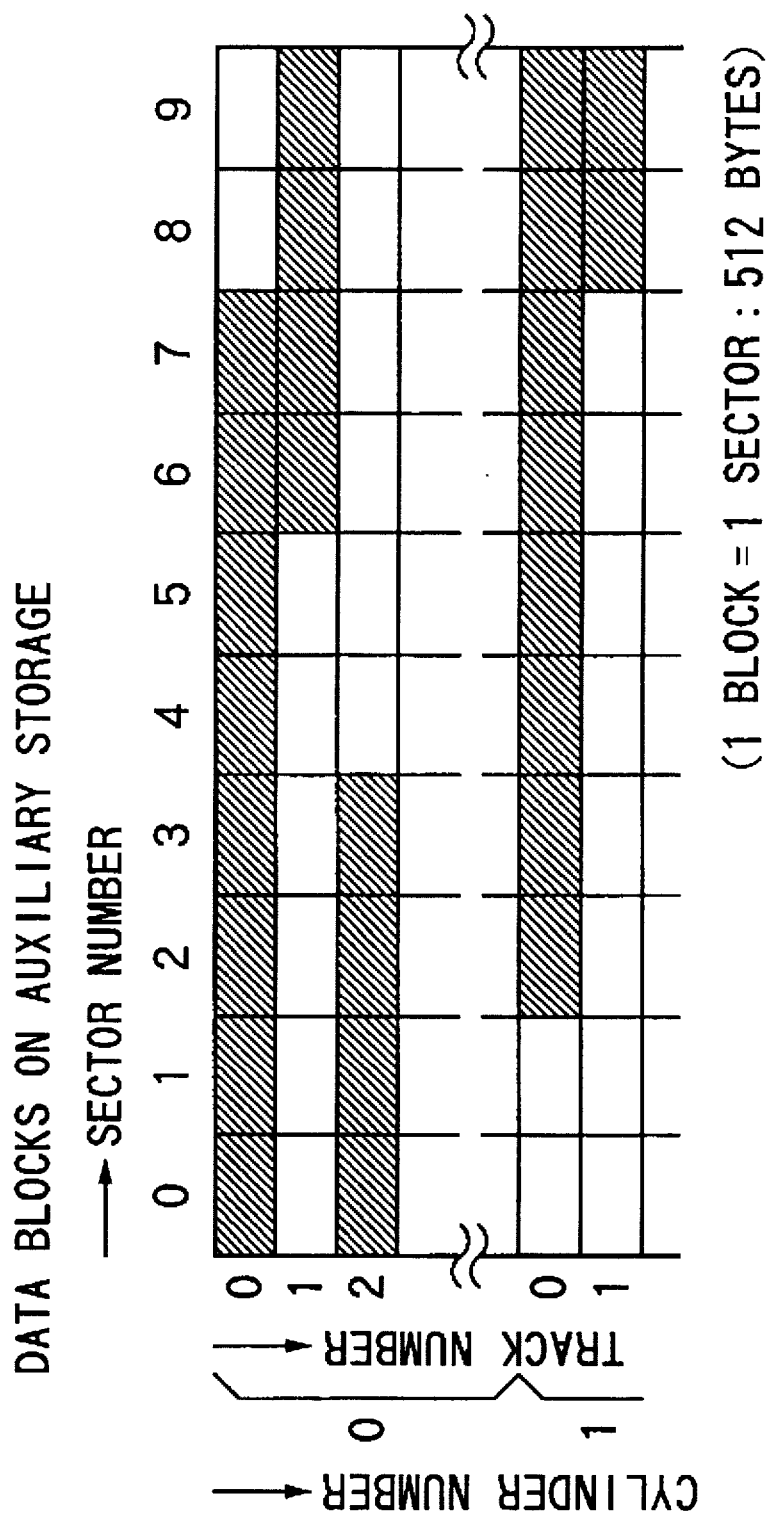
FIG. 11 is a diagram to show the data disposition on the auxiliary storage according to the setting of FIG. 10.

FIG. 9 shows the data disposition when the data are written to the auxiliary storage 19 with the device address "1" in FIG. 6 according to the optimum process data length of 2048 bytes and the optimum gap value of 4 (8192 bytes). As shown in the figure, the data for each optimum process data length is disposed without extending over a plurality of tracks. Since data are processed for the auxiliary storage 19 treating the optimum process data length as a processing unit, switching between tracks or cylinders does not occur while the data is written or read by process data length. This minimizes the waiting time of the disk and enables high-speed data processing.

Obviously, various modifications can be made to the above embodiments. It is intended to cover in the appended claims all such modifications and variations as fall within the true spirit and scope of the present invention.

What is claimed is:

1. A storage control system comprising:
   a plurality of auxiliary storages,
   a device information obtaining means for obtaining device information from a specified auxiliary storage of said plurality of auxiliary storages,
   a system information generation means for determining a process data length and a gap value to minimize switching between cylinders or tracks in reading/writing of data for said specified auxiliary storage based on the device information obtained by said device information obtaining means,
   a system information storage means for storing the process data length and the gap value determined by said system information generation means for said specified auxiliary storage, and
   a data area generation means for securing a data area on said specified auxiliary storage according to the process data length and the gap value stored in said system information storage means.

2. A storage control system as in claim 1, wherein
said process data length determined by said system information generation means is less than a size of one track for said specified auxiliary storage and the size of one track can be divided by said process data length.

3. A storage control system as in claim 1, wherein
said system information generation means determines the process data length and the gap value to satisfy the condition that the process data length is less than a size of a track in said specified auxiliary storage and a sum of the process data length and the gap value is a value obtainable by multiplying the track size by an integer.

4. A storage control system as in claim 1, wherein
said system information generation means determines the process data length and the gap value to satisfy the condition that the said process data length is less than a size of a track in said specified auxiliary storage and either of the following conditions is satisfied:
  (a) the size of a track in said specified auxiliary storage can be divided by said process data length,
  (b) the sum of the process data length and the gap value is a value obtainable by multiplying the track size by an integer.

5. A storage control system as in claim 1 further comprising a data processing means for reading or writing data from or to said specified auxiliary storage according to the process data length and the gap value stored in said system information storage means.

6. A storage control system as in claim 1, wherein
said device information includes a number of tracks per cylinder, a number of sectors per track and a number of bytes per sector for said specified auxiliary storage.

* * * * *